United States Patent
Wu et al.

(10) Patent No.: US 10,578,438 B2
(45) Date of Patent: Mar. 3, 2020

(54) OPTICAL GYROSCOPE, ELECTRO-OPTIC SYSTEM, AND METHODS OF FORMING THE SAME

(71) Applicant: Agency for Science, Technology and Research, Singapore (SG)

(72) Inventors: Guoqiang Wu, Singapore (SG); Jifang Tao, Singapore (SG); Alex Yuandong Gu, Singapore (SG); Junfeng Song, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 44 days.

(21) Appl. No.: 16/076,563

(22) PCT Filed: Jan. 24, 2017

(86) PCT No.: PCT/SG2017/050034
§ 371 (c)(1),
(2) Date: Aug. 8, 2018

(87) PCT Pub. No.: WO2017/138884
PCT Pub. Date: Aug. 17, 2017

(65) Prior Publication Data
US 2019/0049249 A1 Feb. 14, 2019

(30) Foreign Application Priority Data
Feb. 12, 2016 (SG) ............ 10201601054U

(51) Int. Cl.
*G01C 19/72* (2006.01)
*G02B 6/12* (2006.01)

(52) U.S. Cl.
CPC ....... *G01C 19/727* (2013.01); *G02B 6/12007* (2013.01)

(58) Field of Classification Search
CPC .................................................. G01C 19/727
See application file for complete search history.

(56) References Cited

U.S. PATENT DOCUMENTS 4,514,088 A  4/1985  Coccoli
4,658,401 A *  4/1987  Segre ............ H01S 3/083
                                               356/461

(Continued)

OTHER PUBLICATIONS

Suzuki et al., "Monolithically Integrated Resonator Microoptic Gyro on Silica Planar Lightwave Circuit," Journal of Lightwave Technology, vol. 18, No. 1, Jan. 2000, pp. 66-72.

(Continued)

*Primary Examiner* — Shawn Decenzo
(74) *Attorney, Agent, or Firm* — Winstead PC

(57) ABSTRACT

Various embodiments may provide an optical gyroscope. The optical gyroscope may include a ring resonator, an input source configured to generate or provide a first light beam and a second light beam to the ring resonator, and a switching pathway having an input end and an output end coupled to the ring resonator, and may include a plurality of switches. The optical gyroscope may include a control circuit configured to control the plurality of switches to allow the first light beam to propagate from the input end to the output end along the switching pathway during a first time interval, and allow the second light beam to propagate from the input end to the output end along the switching pathway during a second time interval. The optical gyroscope may additionally include a detector loop configured to receive the first light beam and the second light beam from the ring resonator.

20 Claims, 9 Drawing Sheets

(56) References Cited

U.S. PATENT DOCUMENTS

| | | | |
|---|---|---|---|
| 4,789,241 A | 12/1988 | Michal et al. | |
| 5,331,403 A | 7/1994 | Rosker et al. | |
| 5,363,192 A | 11/1994 | Diels et al. | |
| 5,767,969 A * | 6/1998 | Chevalier | G01C 19/727 356/461 |
| 5,969,816 A | 10/1999 | Kim et al. | |
| 8,031,343 B2 | 10/2011 | Carothers et al. | |
| 8,659,760 B2 * | 2/2014 | Sanders | G01C 19/727 356/461 |
| 9,945,670 B2 * | 4/2018 | Lefevre | G01C 19/727 |
| 2007/0121116 A1 * | 5/2007 | Greening | G01C 19/726 356/460 |
| 2015/0369606 A1 * | 12/2015 | Sanders | G01C 19/727 356/461 |
| 2018/0266889 A1 * | 9/2018 | Tao | G01J 5/0803 |
| 2018/0328732 A1 * | 11/2018 | Sanders | G01C 19/727 |
| 2018/0356229 A1 * | 12/2018 | Porsandeh Khial | G01C 19/722 |
| 2019/0212148 A1 * | 7/2019 | Sanders | G02B 6/02366 |

OTHER PUBLICATIONS

Dell'Olio et al., "Recent Advances in Miniaturized Optical Gyroscopes," J. Europ. Opt. Soc. Rap. Public, vol. 9, 14013, 2014, pp. 1-14.

Ciminelli et al., "Photonic Technologies for Angular Velocity Sensing," Advances in Optics and Photonics, vol. 2, 2010, pp. 370-404.

Hang et al., "Optical Kerr Effect in a Direction-Switched Fiber Laser Gyroscope," IEEE Journal of Quantum Electronics, vol. 35, No. 10, Oct. 1999, pp. 1424-1429.

International Preliminary Report on Patentability for International Application No. PCT/SG2017/050034 dated Aug. 14, 2018, pp. 1-5.

Written Opinion of the International Searching Authority for International Application No. PCT/SG2017/050034 dated Apr. 3, 2017, pp. 1-4.

* cited by examiner

FIG. 2A

200a provide a ring resonator
— 202 provide an input source configured to generate a first light beam and a second light beam to the ring resonator
— 204 couple a switching pathway having an input end and an output end to the ring resonator
— 206 provide a control circuit
— 208 provide a detector loop
— 210

FIG. 2B

200b activate the light source of the gyroscope to generate a first light beam and a second light beam
— 212 rotate the optical gyroscope by an angle
— 214 determine a rotation of the gyroscope based on an interference pattern generated based on the first light beam and the second light beam
— 216

US 10,578,438 B2

OPTICAL GYROSCOPE, ELECTRO-OPTIC SYSTEM, AND METHODS OF FORMING THE SAME

CROSS-REFERENCE TO RELATED APPLICATION

This application claims the benefit of priority of Singapore application No. 102016010540 filed on Feb. 12, 2016, the contents of it being hereby incorporated by reference in its entirety for all purposes.

TECHNICAL FIELD

Various aspects of this disclosure relate to optical gyroscopes and/or electro-optic systems. Various aspects of this disclosure relate to methods of forming optical gyroscopes and/or electro-optic systems.

BACKGROUND

Optical gyroscopes have gained great interest in navigation fields due to their wide dynamic range, high resolution and immunization to mechanical shocks and vibrations. Currently, high-grade angular velocity sensing applications are dominated by two well-established optical technologies. The first technology is Ring Laser Gyroscopes (RLGs) technology and the second technology is Fiber Optic Gyroscopes (FOGs) technology. Both are based on the Sagnac effect and have high angular rate resolution. RLGs and FOGs are bulk sensors with good performance, but may be incompatible with some key emerging applications such as attitude and orbit control of micro/nano satellites, unmanned aerial vehicle etc. due to weight, size, costs, and/or power consumption issues.

Integrated optical gyroscopes (IOGs) are attractive due to their compact size, low cost and/or potentially high performance. IOGs may be suitable for the next generation inertial rotation measurement. In a resonator IOG, the main critical aspect is the lock-in effect (mode locking), which is caused by the crosstalk of the counter-propagating light beams. When both the clockwise and counterclockwise light beams exist simultaneously in the ring resonator, various detrimental interaction effects may result, which may degrade the performance of the gyroscope.

SUMMARY

Various embodiments may provide an optical gyroscope. The optical gyroscope may include a ring resonator. The optical gyroscope may also include an input source configured to generate or provide a first light beam and a second light beam to the ring resonator. The optical gyroscope may further include a switching pathway having an input end and an output end coupled to the ring resonator. The switching pathway may include a plurality of switches. The optical gyroscope may include a control circuit configured to control the plurality of switches to allow the first light beam to propagate from the input end to the output end along the switching pathway during a first time interval, and further configured to allow the second light beam to propagate from the input end to the output end along the switching pathway during a second time interval. The optical gyroscope may additionally include a detector loop configured to receive the first light beam and the second light beam from the ring resonator. The detector loop may be further configured to remove a time delay between the first light beam and the second light beam. The detector loop may be additionally configured to combine the first light beam and the second light beam to produce an interference pattern after removing the time delay.

Various embodiments may provide a method of forming an optical gyroscope. The method may include providing a ring resonator. The method may also include providing an input source configured to generate a first light beam and a second light beam to the ring resonator. The method may further include coupling a switching pathway having an input end and an output end to the ring resonator, the switching pathway including a plurality of switches. The method may additionally include providing a control circuit, wherein the control circuit is configured to control the plurality of switches to allow the first light beam to propagate from the input end to the output end along the switching pathway during a first time interval, and further configured to allow the second light beam to propagate from the input end to the output end along the switching pathway during a second time interval. The method may also include providing a detector loop, wherein the detector loop is configured to receive the first light beam and the second light beam from the ring resonator, wherein the detector loop is further configured to remove a time delay between the first light beam and the second light beam, and wherein the detector loop is additionally configured to combine the first light beam and the second light beam to produce an interference pattern after removing the time delay.

BRIEF DESCRIPTION OF THE DRAWINGS

The invention will be better understood with reference to the detailed description when considered in conjunction with the non-limiting examples and the accompanying drawings, in which:

FIG. 2A is a schematic showing a method of forming an optical gyroscope according to various embodiments.

FIG. 2B is a schematic showing a method of using an optical gyroscope according to various embodiments.

DETAILED DESCRIPTION

Figure 1A:
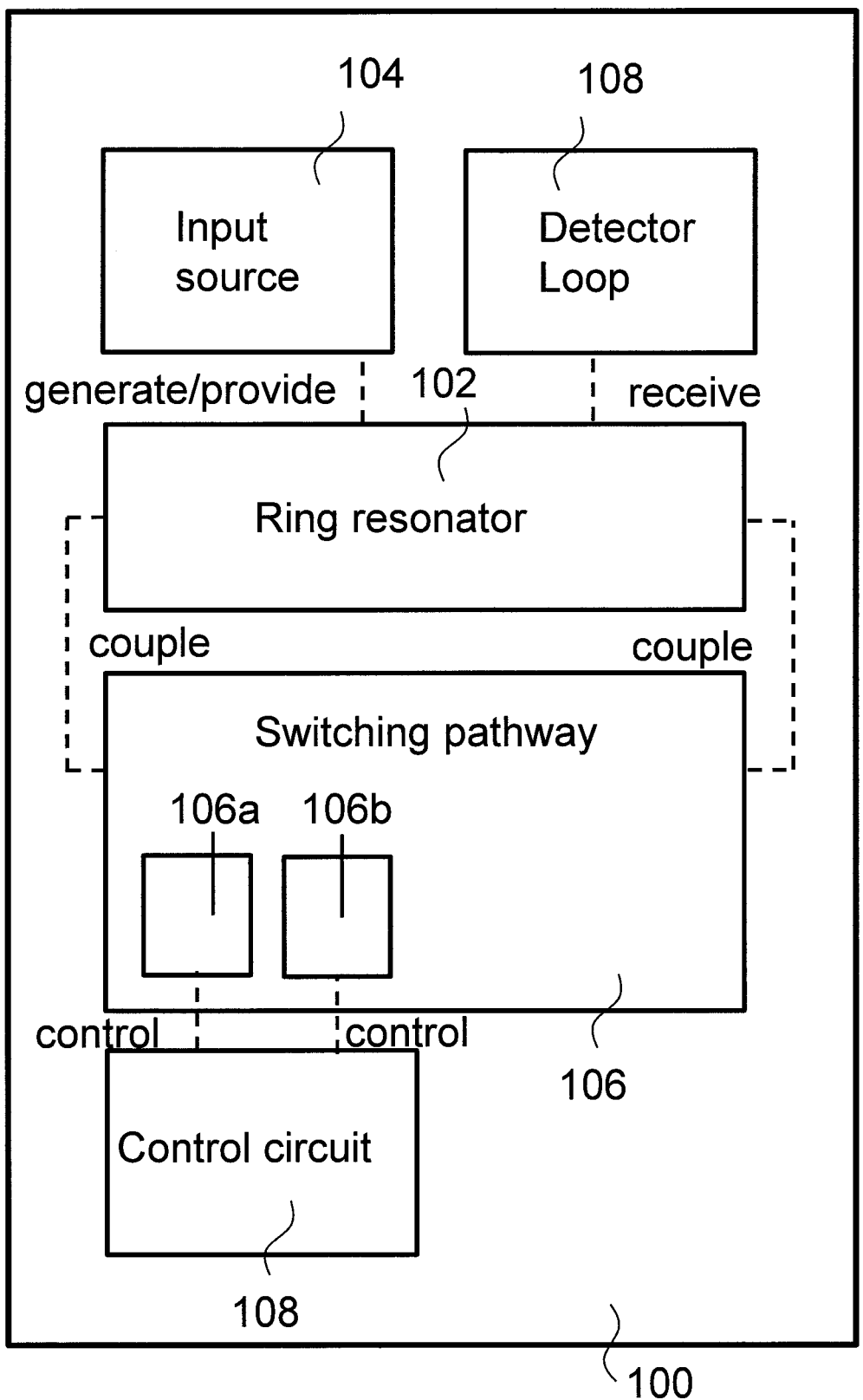
FIG. 1A is a schematic showing an optical gyroscope according to various embodiments.

Several approaches have been implemented to reduce the interactions of the counter-propagating light beams. A direction-switched mode-locked laser gyroscope, which is operated by pluses generated from an optical switch connected to the Sagnac loop, has been proposed. An electro-optic switch of thin film construction, which alternatingly injects a beam of light from a laser in a clockwise and a counterclockwise direction into the delivery loop, has also been reported. Further, an optical gyroscope having segmented paths in which the first waveguide guides the light in the clockwise direction and the second waveguide guides the light in the counter clockwise direction has also been proposed.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or gyroscopes/systems are analogously valid for the other methods or gyroscopes/systems. Similarly, embodiments described in the context of a method are analogously valid for a gyroscopes/systems, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may also be used herein to mean that the deposited material may be formed "indirectly on" the implied side or surface with one or more additional layers being arranged between the implied side or surface and the deposited material. In other words, a first layer "over" a second layer may refer to the first layer directly on the second layer, or that the first layer and the second layer are separated by one or more intervening layers.

The optical gyroscope or electro-optic system as described herein may be operable in various orientations, and thus it should be understood that the terms "top", "bottom", etc., when used in the following description are used for convenience and to aid understanding of relative positions or directions, and not intended to limit the orientation of the optical gyroscope or electro-optic system.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Various embodiments may seek to address the abovementioned issues. Various embodiments may address or eliminate the issues of lock-in phenomenon. Various embodiments may seek to reduce or prevent detrimental interaction effects. Various embodiments may to address issues facing conventional optical gyroscopes such as durability to mechanical shocks, bulkiness and/or high costs. Various embodiments may possess advantages over conventional optical gyroscopes. Various embodiments may have high stability, high resolution, improved durability to mechanical shock, improved integration and/or more compact size.

FIG. 1A is a schematic showing an optical gyroscope 100 according to various embodiments. The optical gyroscope 100 may include a ring resonator 102. The optical gyroscope 100 may also include an input source 104 configured to generate or provide a first light beam and a second light beam to the ring resonator 102. The optical gyroscope 100 may further include a switching pathway 106 having an input end and an output end coupled to the ring resonator 106. The switching pathway 106 may include a plurality of switches 106a. 106b. The optical gyroscope 100 may include a control circuit 108 configured to control the plurality of switches 106a, 106b to allow the first light beam to propagate from the input end to the output end along the switching pathway 106 during a first time interval, and further configured to allow the second light beam to propagate from the input end to the output end along the switching pathway 106 during a second time interval. The optical gyroscope 100 may additionally include a detector loop 108 configured to receive the first light beam and the second light beam from the ring resonator 102. The detector loop 108 may be further configured to remove a time delay between the first light beam and the second light beam. The detector loop 108 may be additionally configured to combine the first light beam and the second light beam to produce an interference pattern after removing the time delay.

In other words, the optical gyroscope 100 may include a ring resonator 102 and a switching pathway 106 coupled at a first end and a second end to the ring resonator 102. The switching pathway 106 may include a plurality of switches 106a, 106b, which may be controlled by a control circuit 108. The optical gyroscope 100 may also include an input source 104 and a detector loop 108 coupled to the ring resonator 102. During operation, the control circuit 108 may control the plurality of switches 106a, 106b so that during different timings, different light beams are able to travel from the first end of the switching pathway 106 to the second end of the switching pathway 106.

Various embodiments may eliminate or reduce interaction effects by an optical switching configuration, which may include the switching pathway 106, the plurality of switches 106a, 106b, and the control circuit 108.

In various embodiments, a "circuit" may be understood as any kind of a logic implementing entity, which may be special purpose circuitry or a processor executing software stored in a memory, firmware, or any combination thereof. Thus, in various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail herein may also be understood as a "circuit" in accordance with various alternative embodiments.

In various embodiments, a first optical element "coupled" to a second element may mean that the first optical element is optically coupled to the second element so that an optical signal may travel between the first optical element and the second optical element. For instance, the input end of the switching pathway 106 may be optically coupled to the ring resonator 102, and the output end of the switching pathway 106 may also be optically coupled to the ring resonator 102.

In various embodiments, the first light beam may be guided or provided in a counter-clockwise direction along the ring resonator 102, and the second light beam may be guided or provided in a clockwise direction along the ring resonator 102. In various alternate embodiments, the first light beam may be guided or provided in a clockwise direction along the ring resonator, and the second light beam may be guided or provided in a counter-clockwise direction along the ring resonator 102.

In the present context, a switch may refer to an optical switch. An optical switch may be an optical element that selectively switches an optical signal from a first optical component to a second optical component. In various embodiments, the optical switch may allow the optical signal to pass from the first optical component to the second optical component at a first instance under a first control signal, and may disallow or prevent the optical signal to pass from the first optical component to the second optical component at a second instance under a second control signal. In various embodiments, an optical switch may include a first branch and a second branch. The first branch may be configured to carry the first optical signal, and the second branch may be configured to carry the second optical signal. In various embodiments, the optical switch may be configured so that when the optical switch is in the first state, the first branch is activated or switched on (thus allowing the first optical signal to pass through) and the second branch is deactivated or switched off (thus disallowing or preventing the second optical signal to pass through), and when the optical switch is in the second state, the first branch is deactivated or switched off (thus disallowing or preventing the first optical signal to pass through) and the second branch is activated or switched on (thus allowing the second optical signal to pass through).

In various embodiments, the plurality of optical switches 106a, 106b may include a first optical switch 106a having a first branch configured to allow the first light beam to propagate from the ring resonator 102 into the switching pathway 106 during the first time interval, and a second branch configured to allow the second light beam to propagate from the ring resonator 102 into the switching pathway 106 during the second time interval.

In various embodiments, the plurality of optical switches 106a, 106b may include a second optical switch 106b having a first branch configured to allow the first light beam in the switching pathway 106 to propagate back to the ring resonator 102 during the first time interval, and a second branch configured to allow the second light beam in the switching pathway 106 to propagate back to the ring resonator 102 during the second time interval.

In various embodiments, the second branch of the first optical switch 106a may be configured to stop the propagation of the second light beam from the ring resonator 102 into the switching pathway 106 during the first time interval, and the first branch of the first optical switch 106a may be configured to stop the propagation of the first light beam from the ring resonator 102 into the switching pathway 106 during the second time interval.

In various embodiments, the second branch of the second optical switch 106b may be configured to stop the propagation of the second light beam in the switching pathway 106 back to the ring resonator 102 during the first time interval, and the first branch of the second optical switch 106b may be configured to stop the propagation of the first light beam in the switching pathway 106 back to the ring resonator 102 during the second time interval.

In various embodiments, the switching pathway may further include an optic amplifier configured to amplify the first light beam propagating in the switching pathway during the first time interval, and further configured to amplify the second light beam to propagating in the switching pathway during the second time interval.

The optic amplifier may include a gain medium. The optic amplifier may be configured to amplify the first light beam during the first time interval to compensate for the optic loss of the first beam during the first time interval. Similarly, the optic amplifier may be configured to amplify the second light beam during the second time interval to compensate for the optic loss of the second beam during the second time interval.

The optic amplifier may be configured not to amplify the second light beam in the switching pathway during the first time interval, and may be further configured not to amplify the first light beam in the switching pathway during the second time interval. Accordingly, the optic amplifier may be configured to allow the second light beam to vanish during the first time interval, and may be configured to allow the first light beam to vanish during the second time interval.

The optic amplifier may be between the first optical switch 106a and the second optical switch 106b. A first end of the optic amplifier may be coupled to the first optical switch and a second end of the optic amplifier may be coupled to the second optical switch In various embodiments, the optical gyroscope 100 may further include a first waveguide coupling the first optical switch 106a and the optic amplifier. The optical gyroscope 100 may further include a second waveguide coupling the second optical switch 106b and the optic amplifier.

The switching pathway 106 may further include a first optical coupler coupling the ring resonator 102 and the first optical switch 106a. The switching pathway 106 may also include a second optical coupler coupling the ring resonator 102 and the second optical switch 106b.

The optical gyroscope 100 may further include a detector configured to detect the interference pattern. In various embodiments, the detector loop 108 may include the detector. In various embodiments, the detector may be coupled to the detector loop 108. The detector may be a photodetector such as a photodiode or a charge coupled detector (CCD).

The detector loop 108 may include a time delay module configured to remove the time delay between the first light beam and the second light beam. In various embodiments, removing the time delay between the first light beam and the second light beam may refer to slowing down the first light beam so that both the first light beam and the second light beam may be in the detector loop at the same time.

The detector loop 108 may further include an optical combiner configured to combine the first light beam and the second light beam after removing the time delay. The detector loop 108 may further include an output optical coupler coupling the ring resonator 102 and the optical combiner. The output optical coupler may couple the ring resonator 102 to the optical combiner.

In various embodiments, the plurality of switches 106a, 106b may include a first optical switch 106a and a second optical switch 106b. It may also be envisioned that in various other embodiments, the plurality of switches 106a, 106b may include more than two optical switches. For instance, in various embodiments, the switching pathway 106 may include four optical switches.

In various embodiments, the control circuit 108 may be electrically coupled to the plurality of switches. The control circuit 108 may be configured to provide control signals to the plurality of optical switches to allow/disallow the first light beam and/or the second light beam to pass through the switching pathway 106.

For instance, the control circuit 108 may be coupled to a first optical switch 106a and a second optical switch 106b. When the control circuit 108 transmits a first control signal to the first optical switch 106a and the second optical switch 106b, the first branch of the first optical switch 106a and the first branch of the second optical switch 106b may be activated or switched on, thus allowing the first optical beam to pass through the first optical switch 106a and the second optical switch 106b, while the second branch of the first optical switch 106a and the second branch of the second optical switch 106b may be deactivated or switched off, thus disallowing or preventing the second optical beam to pass through the first optical switch 106a and the second optical switch 106b. When the control circuit 108 transmits a second control signal to the first optical switch 106a and the second optical switch 106b, the second branch of the first optical switch 106a and the second branch of the second optical switch 106b may be activated or switched on, thus allowing the second optical beam to pass through the first optical switch 106a and the second optical switch 106b, while the first branch of the first optical switch 106a and the first branch of the second optical switch 106b may be deactivated or switched off, thus disallowing or preventing the first optical beam to pass through the first optical switch 106a and the second optical switch 106b.

In various embodiments, the control circuit 108 may be configured to transmit the first control signal during the first time interval and may be configured to transmit the second control signal during the second time interval.

In various embodiments, the first time interval may be substantially equal to the second time interval. In other words, the first time interval and the second time interval may be of the same duration.

The input end of the switching pathway may be coupled to a first point along the ring resonator 102, and the output end of the switching pathway may be coupled to a second point along the ring resonator 102. A distance from the first point and the second point may be or may be substantially equal to a diameter of the ring resonator 102.

The detector loop 108 may be coupled to a third point along the ring resonator 102. The third point may be equidistant from the first point and the second point.

In various embodiments, the ring resonator 102 may further include a phase modulator for compensating output drift due to temperature variation. In various embodiments, the optical gyroscope 100 may include a phase modulator coupled to the ring resonator. In various embodiments, the phase modulator may be comprised in the ring resonator.

In various embodiments, the input source may be an optical source such as a laser. The input source may be configured to generate the first light beam and the second light beam. The input source may be a broadband source, or may be configured to generate a single wavelength.

Figure 1B:
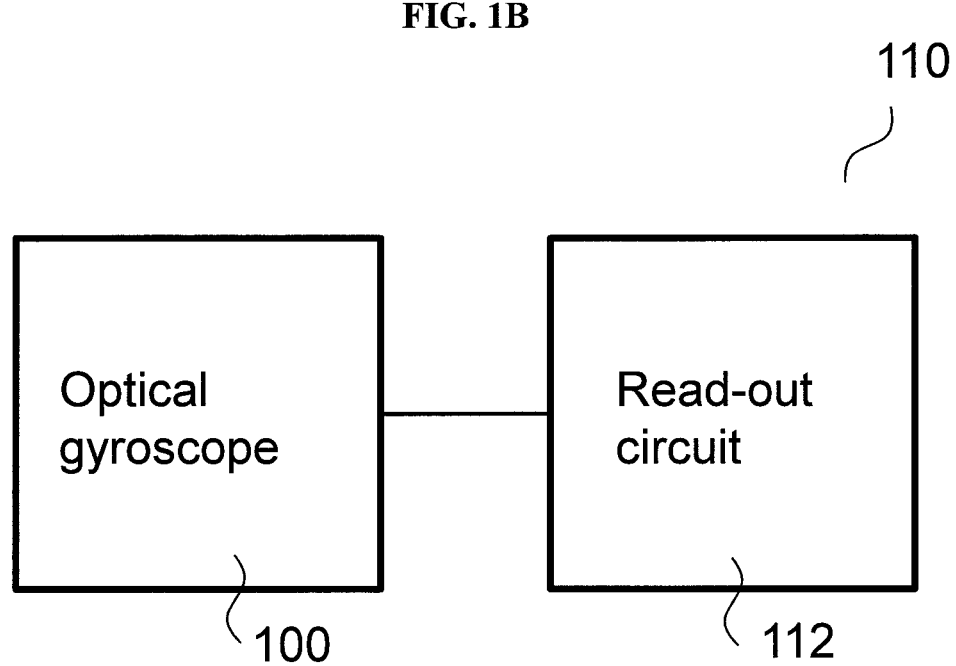
FIG. 1B is a schematic showing an electro-optic system according to various embodiments.

FIG. 1B is a schematic showing an electro-optic system 110 according to various embodiments. The electro-optic system 110 may include an optical gyroscope 100 as described herein. The electro-optic system 110 may also include a read-out circuit 112 electrically coupled to the optical gyroscope 100.

In various embodiments, the readout circuit 112 or the optical gyroscope 100 may be configured to determine a rotation angle based on the interference pattern. The interference pattern may indicate a frequency difference between the first beam and the second beam. The rotation angle may be determined based on the frequency difference. The optical gyroscope 100 or the read-out circuit 112 may include a processor circuit configured to determine the rotation angle.

In various embodiments, the electro-optic system 110 may include a substrate. The optical gyroscope 100 may be on the substrate. The readout circuit 112 may be on the substrate.

The substrate may be a semiconductor substrate such as a silicon substrate.

The electro-optic system 110 may be a quad flat no-lead package (QFP).

FIG. 2A is a schematic 200a showing a method of forming an optical gyroscope according to various embodiments. The method may include, in 202, providing a ring resonator. The method may also include, in 204, providing an input source configured to generate a first light beam and a second light beam to the ring resonator. The method may further include, in 206, coupling a switching pathway having an input end and an output end to the ring resonator, the switching pathway including a plurality of switches. The method may additionally include, in 208, providing a control circuit, wherein the control circuit is configured to control the plurality of switches to allow the first light beam to propagate from the input end to the output end along the switching pathway during a first time interval, and further configured to allow the second light beam to propagate from the input end to the output end along the switching pathway during a second time interval. The method may also include, in 210, providing a detector loop, wherein the detector loop is configured to receive the first light beam and the second light beam from the ring resonator, wherein the detector loop is further configured to remove a time delay between the first light beam and the second light beam, and wherein the detector loop is additionally configured to combine the first light beam and the second light beam to produce an interference pattern after removing the time delay.

In other words, the method may include coupling a first end and a second end of a switching pathway to the ring resonator. A control circuit may be used to control a plurality of switches in the optical pathway to control or direct a first light beam and a second light beam. An input source may be used to generate the light beams and a detector loop may be used to detect an interference pattern due to the first light beam and the second light beam.

Various embodiments may provide a method of forming an electro-optic system. The method may include coupling a read-out circuit to the gyroscope as described herein.

Various embodiments may include using an optical gyroscope as described herein. FIG. 2B is a schematic 200b showing a method of using an optical gyroscope according to various embodiments. The method may include, in 212, activating the light source of the gyroscope to generate a first light beam and a second light beam. The method may include, in 214, rotating the optical gyroscope by an angle. The method may additionally include, in 216, determining a rotation of the optical gyroscope (e.g. an angle of rotation of the optical gyroscope) based on an interference pattern generated based on the first light beam and the second light beam.

The method may also include using an electro-optic system as described herein. The method may include activating the light source of the gyroscope to generate a first light beam and a second light beam. The method may include rotating the optical gyroscope or the electro-optic system by an angle. The method may include determining a rotation of the optical gyroscope (e.g. an angle of rotation of the optical gyroscope) based on an output provided by the read-out circuit, wherein the output is based on the interference pattern generated by the first light beam and the second light beam.

Figure 3A:
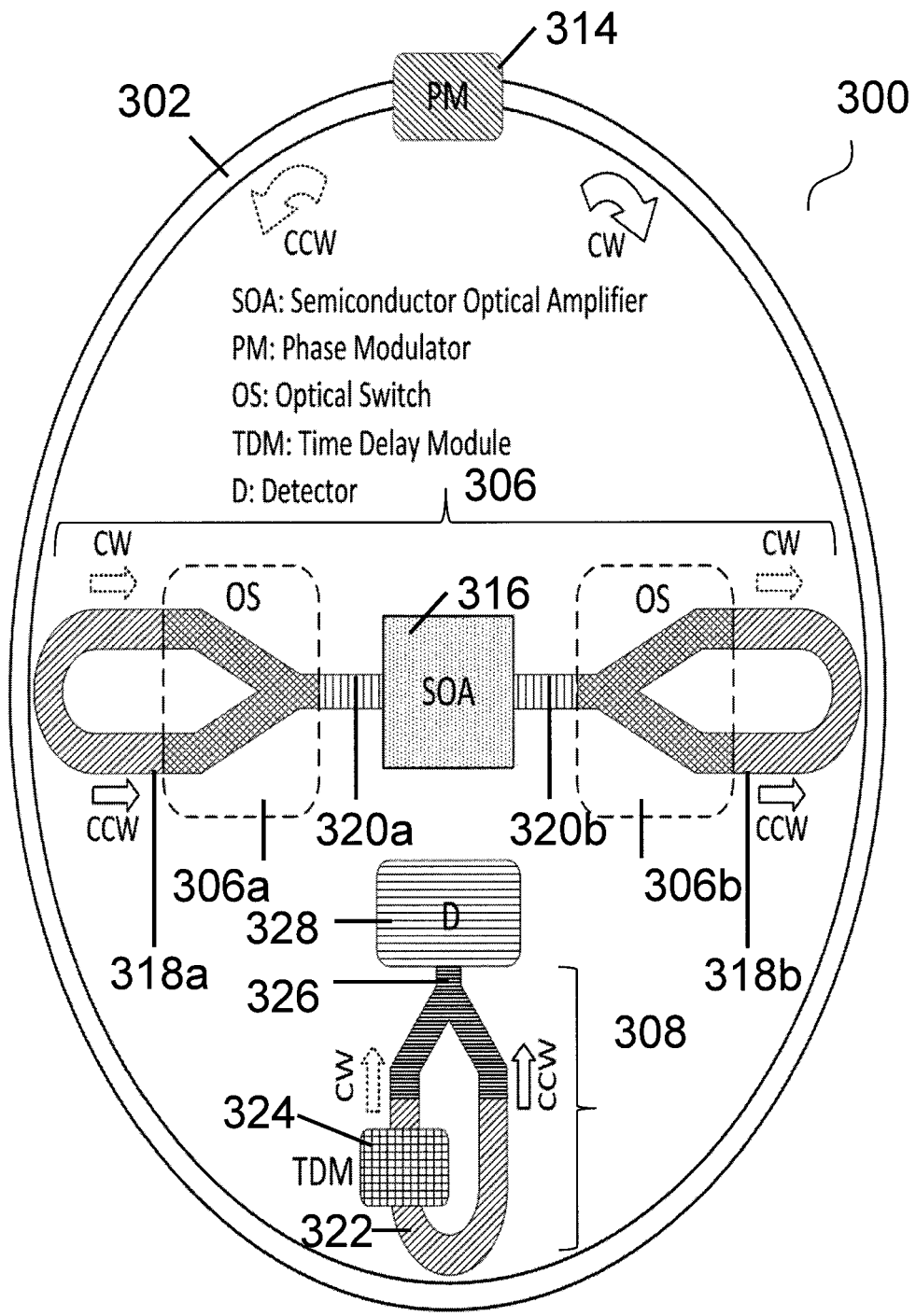
FIG. 3A is a schematic showing an optical gyroscope according to various embodiments.
Figure 3A:
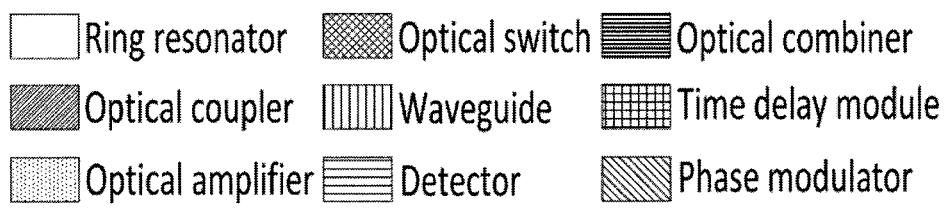

FIG. 3A is a schematic showing an optical gyroscope 300 according to various embodiments. The optical gyroscope 300 may include a ring resonator 302, and a switching pathway 306 including a first optical switch (OS) 306a and a second optical switch (OS) 306b. The switching pathway 306 may be alternatively referred to as a delivery loop. A first end of the switching pathway 306 may be coupled to a first point or portion of the ring resonator 302 and a second end of the switching pathway 306 may be coupled to a second point or portion of the ring resonator 302 different from the first point or portion. The optical gyroscope 300 may also include a detector loop 308. The detector loop 308 may be coupled to a third point or portion of the ring resonator 302. The third point or portion may be different from the first point or portion and the second point or portion. The optical gyroscope 300 may also include a phase modulator (PM) 314, which may be coupled to the ring resonator 302.

The switching pathway 306 may include an optic amplifier 316 such as a semiconductor optic amplifier (SOA). The switching pathway 306 may also include a first optical coupler 318a, a second optical coupler 318b, a first waveguide 320a and a second waveguide 320b. The first optical coupler 318a may couple the first optical switch 306a to the first point or portion of the ring resonator 302. The second optical coupler 318b may couple the second optical switch 306b to the second point or portion of the ring resonator 302. As shown in FIG. 3A, the first optical coupler 318a and the first optical switch 306a may form a loop, and the second optical coupler 318b and the second optical switch 306b may form another loop. The first waveguide 320a may couple the first optical coupler 318a to a first end of the optical amplifier 316. The second waveguide 320b may couple the second optical coupler 318b to a second end of the optical amplifier 316.

The detector loop 308 may include a further optical coupler 322, and a time delay module (TDM) 324 coupled the further optical coupler 322. The detector loop 308 also include an optical combiner 326 coupled to the optical coupler 322. The optical coupler 322 may couple the optical combiner 326 to the third point or portion of the ring resonator 302. The optical gyroscope 300 or detector loop 308 may also include a detector (D) 328 coupled to the optical combiner 326. The detector 328 may be a photodetector.

An input source such as a laser (not shown in FIG. 3) may generate a first light beam and a second light beam and provide the first light beam and the second light beam to the ring resonator 302. The first light beam may be a counterclockwise (CCW) light beam and the second light beam may be a clockwise (CW) light beam. The clockwise (CW) light beam may propagate along the ring resonator 302 in a clockwise manner, while the counterclockwise (CCW) light beam may propagate along the ring resonator 302 in a counterclockwise manner.

The counter-propagating light beams, i.e. the CCW light beam and the CW light beam, may alternatingly pass through the ring resonator 302 using an advanced optical switching construction, which may include the switching pathway 306. The set of optical couplers 318a, 318b may be used to couple the light beams between the ring resonator 302 and the optical switches 306a, 306b. The optical switches 306a, 306b may be synchronized to alternatingly allow the clockwise (CW) light beam or the counterclockwise (CCW) light beam to travel through the switching pathway 306. The optic amplifier 316 may be used to compensate the optical loss and maintain the clockwise and counterclockwise light beams on resonance.

In a first time interval or half period, the lower branches of the optical switches 306a, 306b may be in the "ON" state. The counterclockwise (CCW) light beam may be coupled to the first optical switch 306a through the first optical coupler 318a. The counterclockwise (CCW) light beam may then be guided to the straight first waveguide 320 and may be amplified by the optic amplifier 316. The optic amplifier 316 may amplify the counterclockwise (CCW) light beam to compensate the optic loss in the switching pathway or delivery loop 306. The counterclockwise (CCW) light beam may then pass through the second waveguide 320b and the second optical switch 306b, and may be injected back to the ring resonator 302 through the second optical coupler 318b. In this first time interval or half period, the upper branches of the optical switches may be at the "OFF" state. The clockwise (CW) light beam may not be allowed to propagate and amplified along the switching pathway 306 between the first optical coupler 318a and the second optical coupler 318b. The clockwise (CW) light beam may vanish since no optic compensation is done for the clockwise (CW) light beam. Accordingly, in the first time interval or half period, only the counterclockwise (CCW) light beam may exist or be present.

In the second time interval or half period, the upper branches of the optical switches 306a, 306b may be in the "ON" state. The clockwise (CW) light beam may propagate and may be amplified along the switching pathway or delivery loop 306. In the second time interval or half period, the lower branches of the optical switches 306a, 306b may be in the "OFF" state. The counterclockwise (CCW) light beam may not be allowed to propagate and amplified along the switching pathway 306 between the first optical coupler 318a and the second optical coupler 318b. The counterclockwise (CCW) light beam may vanish since no optic compensation is done for the counterclockwise (CCW) light beam. Accordingly, in the second time interval or half period, only the clockwise (CW) light beam may exist or be present.

The first optical switch 306a and a second optical switch 306b may be controlled by a control circuit (not shown in FIG. 3), which may also form part of the advanced optical switching construction.

In various embodiments, the advanced optical switching construction through the optical switches 306a, 306b may alternatingly inject the counter-propagating light beams into the switching pathway or delivery loop 306. The counter-propagating light beams may not coexist in the ring resonator 302. Accordingly, the interactions between the two light beams may be eliminated.

The further optical coupler 322 may be used to couple both the clockwise (CW) and counterclockwise (CCW) propagating light beams. The time delay module 324 may be employed to achieve the interference of the counter-propagating lights, since they do not coexist in the resonator. The delay time may be set to make the clockwise light beam in the current half period (i.e. second time interval) meet the counterclockwise (CCW) light beam in the immediate previous half period (i.e. first time interval). The counter-propagating light beams may be combined by the optical combiner 326 and the interference pattern of the counter-propagating lights may be detected by a photodetector 328.

The rotation (e.g. rotate rate or angular rate of rotation) of the optical gyroscope 300 may be deduced by measuring the output intensity of the interference pattern. The output intensity may indicate a difference in the frequency of the counterclockwise (CCW) light beam relative to the frequency of the clockwise (CW) light beam, which may be caused by the rotation of the optical gyroscope 300.

In various embodiments, the advanced optical switching construction may allow counter-propagating light beams to alternately pass from the switching pathway 306 to the ring resonator 302, which may eliminate the various beam interaction effects between the two counter-propagating light beams.

Figure 3B:
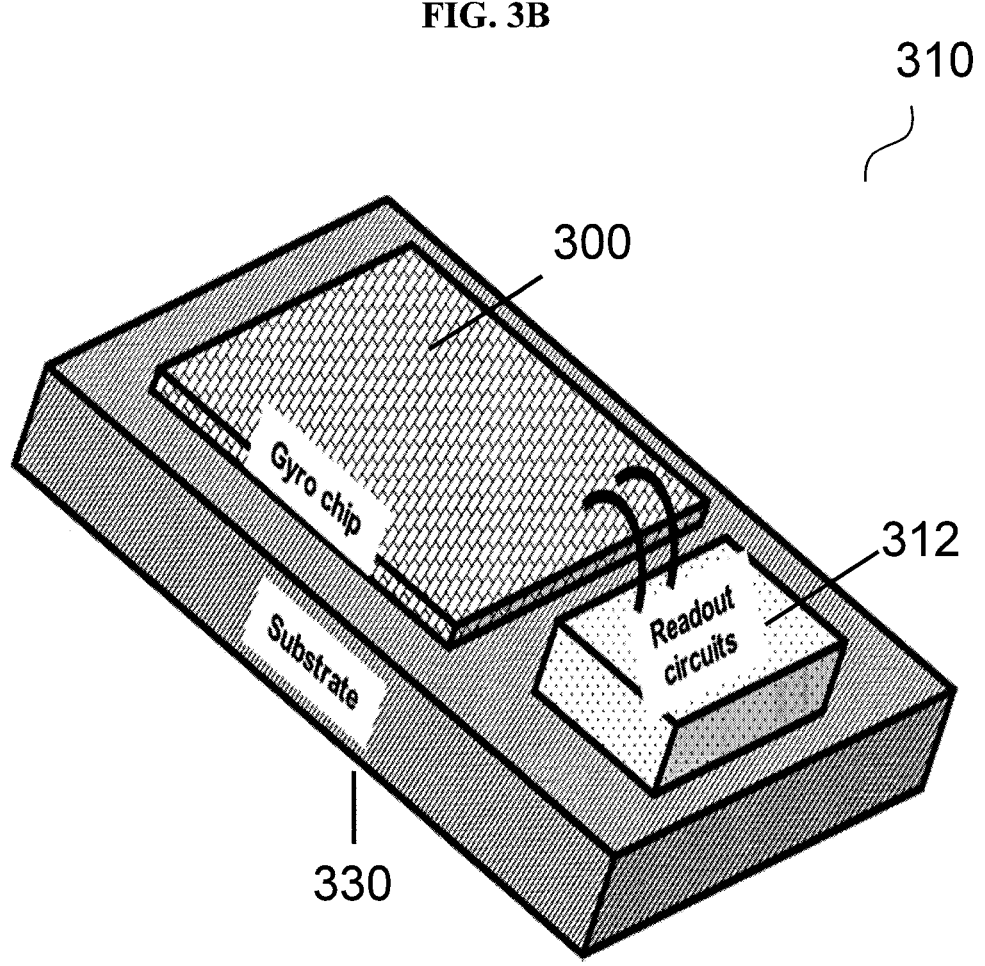
FIG. 3B is a schematic showing an electro-optic system according to various embodiments.

FIG. 3B is a schematic showing an electro-optic system 310 according to various embodiments. The electro-optic system 310 may include a chip including the gyroscope 300 as shown in FIG. 3A, and read-out circuits 312 coupled to the gyroscope 300. The gyroscope chip 300 may be wire-bonded to the read-out circuits 312. The electro-optic system 310 may further include a substrate 330. The gyroscope chip 300 and the read-out circuits may be on the substrate 330 using system-in-package (SIP) technology.

Figure 3C:
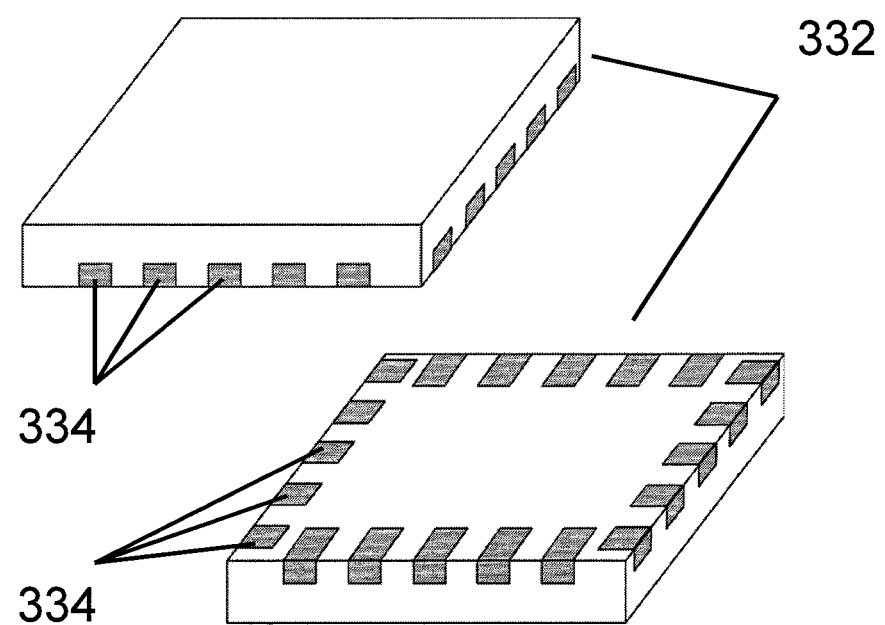
FIG. 3C is a schematic showing quad flat-no lead packages (QFP) including the gyroscopes according to various embodiments.

FIG. 3C is a schematic showing quad flat-no lead packages (QFP) 332 including the gyroscopes 300 according to various embodiments. Each quad flat-no lead package (QFP) 332 may include the electro-optic system 310 encapsulated with a suitable material. Each quad flat-no lead package (QFP) 332 may also include contacts 334 for electrical coupling with external substrates or devices. Not all contacts 334 in FIG. 3C are labelled for clarity purposes.

The gyroscope 300 may be a Sagnac interferometer. The gyroscope 300 may be an active device essentially operating like an electro-optical oscillator. The difference in frequency (Δf) of the counter-propagating light beams may be expressed as, $$\Delta f = \frac{4A}{\lambda L} \Omega \quad (1)$$

where A is the enclosed area, L is the optical path length, and λ is the operating wavelength.

Figure 4A:
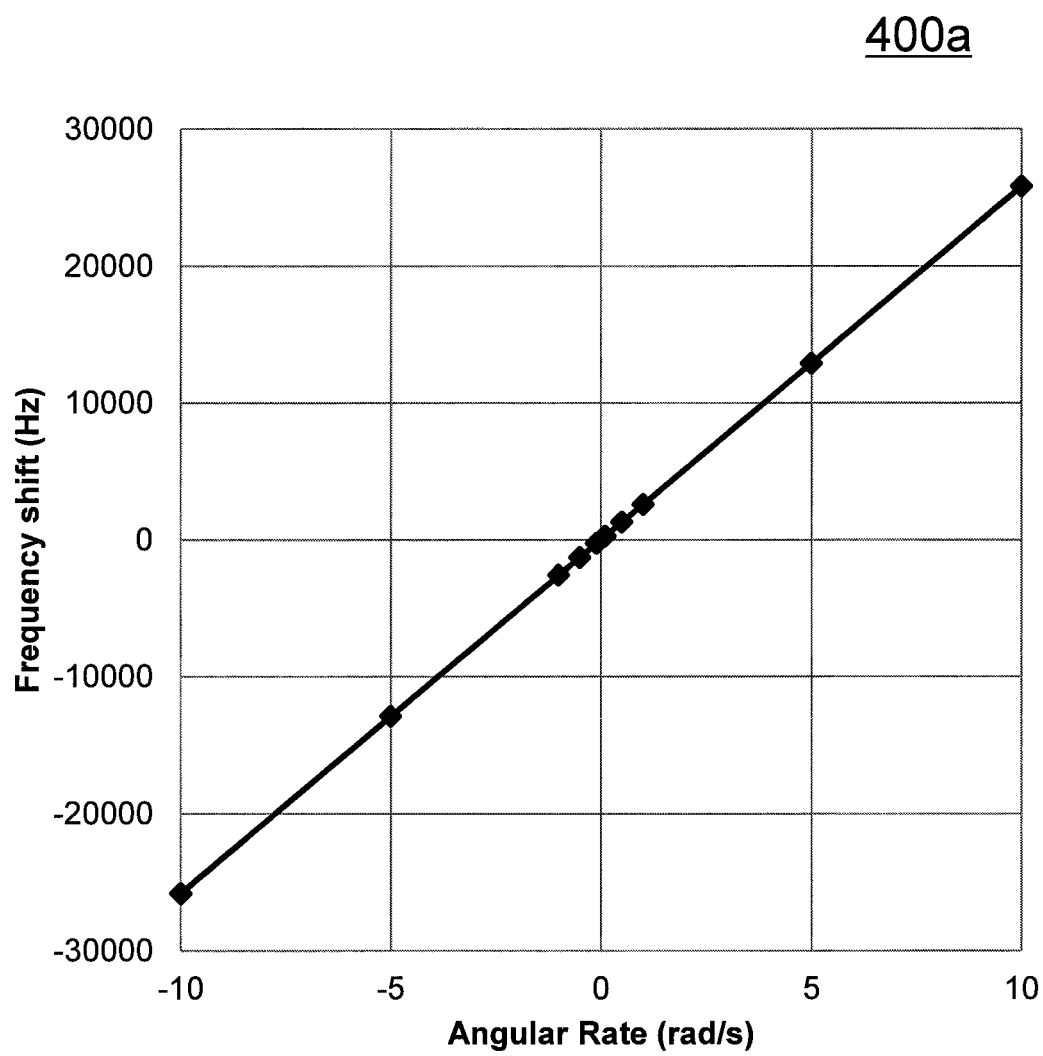
FIG. 4A is a plot of frequency shift (in hertz or Hz) as a function of angular rate (radians per second or rad/s) showing the dependence of the frequency shift on the angular rate of rotation of the gyroscope according to various embodiments.

FIG. 4A is a plot 400*a* of frequency shift (in hertz or Hz) as a function of angular rate (radians per second or rad/s) showing the dependence of the frequency shift on the angular rate of rotation of the gyroscope according to various embodiments. The frequency shift of the counter-clockwise (CW) light beam relative to the clockwise (CW) light beam may be read out by the interference fringe pattern of the two light beams.

Figure 4B:
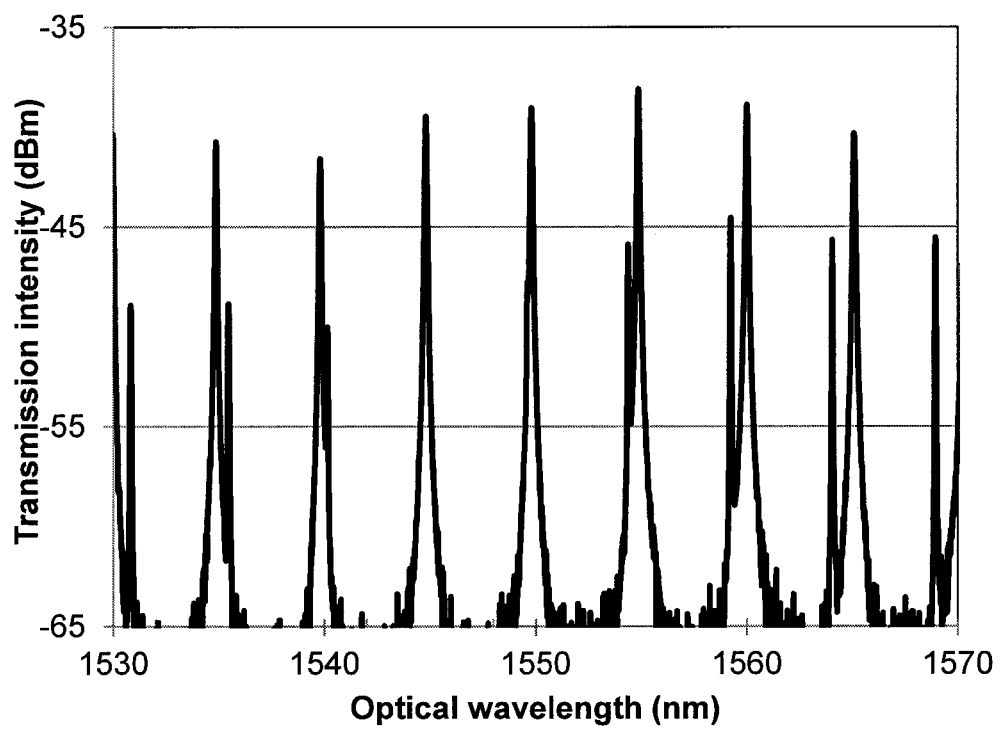
FIG. 4B is a plot of transmission intensity (decibels-metres or dBm) as a function of optical wavelength (nanometers or nm) showing the frequency of a waveguide based ring resonator according to various embodiments.
Figure 4C:
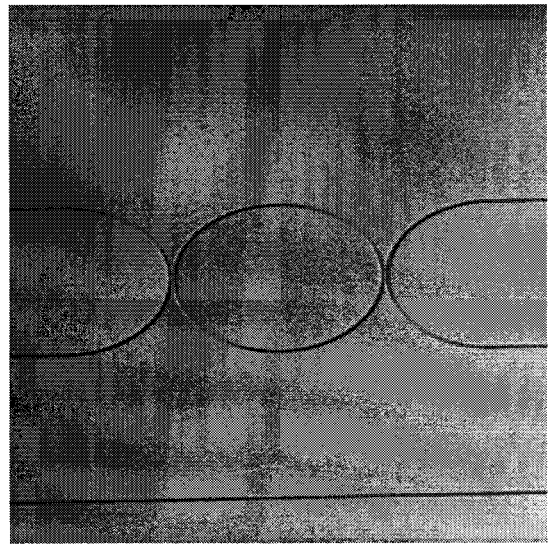
FIG. 4C is a scanning electron microscope (SEM) image of the waveguide based ring resonator according to various embodiments.

FIG. 4B is a plot 400*b* of transmission intensity (decibels-metres or dBm) as a function of optical wavelength (nanometers or nm) showing the frequency of a waveguide based ring resonator according to various embodiments. FIG. 4C is a scanning electron microscope (SEM) image 400*c* of the waveguide based ring resonator according to various embodiments.

Various embodiments may provide an integrated optical gyroscope (IOG) with gain medium advanced switching configuration. The advanced optical switching construction may alternatingly inject the counter-propagating lights into the delivery loop. The optical loss may be compensated by an optic amplifier (or gain medium). The clockwise and counterclockwise light beams may be maintained on resonance.

A phase modulator may be used to compensate the output drift due to temperature variation, resulting in high bias stability. A time delay module may be employed to achieve the interference of the counter-propagating lights before the light beams enter the detector. The time delay module may make the beat frequency measurement easy and accurate.

The counter-propagating light beams may not coexist in the resonator, thereby achieving high resolution, and/or eliminating or reducing various beam interaction effects, such as beats, scattering and/or cross-talk. The high resolution achieved may be due to the elimination of crosstalk.

The resulting IOG may have a potentially high performance, compact size and light weight, due to the integration of photonics and electronics.

In addition, various embodiments may have high durability to mechanical shock, due to the absence of moving parts.

Various embodiments may be suitable in applications such as high grade inertial navigation systems. Various embodiments may be used in navigation for space and unmanned aerial vehicles (due to high performance, compact size and light weight), inertial navigation in harsh environment (due to improved durability to vibration and shocks, resistance to electromagnetic interference (EMI) and/or high temperatures), and/or stability control systems, such as Electronic Stability Control (ESC).

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical gyroscope comprising:
   a ring resonator;
   an input source configured to provide a first light beam and a second light beam to the ring resonator;
   a switching pathway having an input end and an output end coupled to the ring resonator, the switching pathway comprising a plurality of switches;
   a control circuit configured to control the plurality of switches to allow the first light beam to propagate from the input end to the output end along the switching pathway during a first time interval, and further configured to allow the second light beam to propagate from the input end to the output end along the switching pathway during a second time interval; and
   a detector loop configured to receive the first light beam and the second light beam from the ring resonator;
   wherein the detector loop is further configured to remove a time delay between the first light beam and the second light beam; and
   wherein the detector loop is additionally configured to combine the first light beam and the second light beam to produce an interference pattern after removing the time delay.

2. The optical gyroscope according to claim 1,
wherein the plurality of switches comprises:
a first optical switch having a first branch configured to allow the first light beam to propagate from the ring resonator into the switching pathway during the first time interval, and a second branch configured to allow the second light beam to propagate from the ring resonator into the switching pathway during the second time interval; and
a second optical switch having a first branch configured to allow the first light beam in the switching pathway to propagate back to the ring resonator during the first time interval, and a second branch configured to allow the second light beam in the switching pathway to propagate back to the ring resonator during the second time interval.

3. The optical gyroscope according to claim 2,
wherein the second branch of the first optical switch is configured to stop the propagation of the second light beam from the ring resonator into the switching pathway during the first time interval, and the first branch of the first optical switch is configured to stop the propagation of the first light beam from the ring resonator into the switching pathway during the second time interval.

4. The optical gyroscope according to claim 2,
wherein the second branch of the second optical switch is configured to stop the propagation of the second light beam in the switching pathway back to the ring resonator during the first time interval, and the first branch of the second optical switch is configured to stop the propagation of the first light beam in the switching pathway back to the ring resonator during the second time interval.

5. The optical gyroscope according to claim 2,
wherein the switching pathway further comprises an optic amplifier configured to amplify the first light beam propagating in the switching pathway during the first time interval, and further configured to amplify the second light beam to propagating in the switching pathway during the second time interval.

6. The optical gyroscope according to claim 5,
wherein the optic amplifier is configured not to amplify the second light beam in the switching pathway during the first time interval and further configured not to amplify the first light beam in the switching pathway during the second time interval.

7. The optical gyroscope according to claim 5,
wherein the optic amplifier is between the first optical switch and the second optical switch.

8. The optical gyroscope according to claim 5, further comprising:
a first waveguide coupling the first optical switch and the optic amplifier; and
a second waveguide coupling the second optical switch and the optic amplifier.

9. The optical gyroscope according to claim 2,
wherein the switching pathway further comprises:
a first optical coupler coupling the ring resonator and the first optical switch; and
a second optical coupler coupling the ring resonator and the second optical switch.

10. The optical gyroscope according to claim 1, further comprising:
a detector configured to detect the interference pattern.

11. The optical gyroscope according to claim 1,
wherein the detector loop comprises a time delay module configured to remove the time delay between the first light beam and the second light beam.

12. The optical gyroscope according to claim 1,
wherein the detector loop further comprises an optical combiner configured to combine the first light beam and the second light beam after removing the time delay.

13. The optical gyroscope according to claim 12,
wherein the detector loop further comprises an output optical coupler coupling the ring resonator and the optical combiner.

14. The optical gyroscope according to claim 1,
wherein the input end of the switching pathway is coupled to a first point along the ring resonator, the output end of the switching pathway is coupled to a second point along the ring resonator; and
wherein a distance from the first point and the second point is a diameter of the ring resonator.

15. The optical gyroscope according to claim 14,
wherein the detector loop is coupled to a third point along the ring resonator; and
wherein the third point is equidistant from the first point and the second point.

16. The optical gyroscope according to claim 1,
wherein the ring resonator further comprises a phase modulator for compensating output drift due to temperature variation.

17. The optical gyroscope according to claim 1,
wherein the first light beam is guided in a counter-clockwise direction along the ring resonator, and the second light beam is guided in a clockwise direction along the ring resonator.

18. An electro-optic system comprising:
a substrate;
an optical gyroscope on the substrate; the optical gyroscope comprising:
a ring resonator;
an input source configured to provide a first light beam and a second light beam to the ring resonator;
a switching pathway having an input end and an output end coupled to the ring resonator, the switching pathway comprising a plurality of switches;
a control circuit configured to control the plurality of switches to allow the first light beam to propagate from the input end to the output end along the switching pathway during a first time interval, and further configured to allow the second light beam to propagate from the input end to the output end along the switching pathway during a second time interval; and
a detector loop configured to receive the first light beam and the second light beam from the ring resonator; and
a readout circuit on the substrate;
wherein the readout circuit is coupled to the optical gyroscope;
wherein the detector loop is further configured to remove a time delay between the first light beam and the second light beam; and
wherein the detector loop is additionally configured to combine the first light beam and the second light beam to produce an interference pattern after removing the time delay.

19. The system according to claim 18, wherein the system is a quad flat no-lead package (QFP).

20. A method of forming an optical gyroscope, the method comprising:

provamp; providing a ring resonator;

providing an input source configured to generate a first light beam and a second light beam to the ring resonator;

coupling a switching pathway having an input end and an output end to the ring resonator, the switching pathway comprising a plurality of switches;

providing a control circuit, wherein the control circuit is configured to control the plurality of switches to allow the first light beam to propagate from the input end to the output end along the switching pathway during a first time interval, and further configured to allow the second light beam to propagate from the input end to the output end along the switching pathway during a second time interval; and providing a detector loop, wherein the detector loop is configured to receive the first light beam and the second light beam from the ring resonator, wherein the detector loop is further configured to remove a time delay between the first light beam and the second light beam, and wherein the detector loop is additionally configured to combine the first light beam and the second light beam to produce an interference pattern after removing the time delay.

* * * * *